(12) United States Patent
Chen et al.

(10) Patent No.: US 8,019,157 B2
(45) Date of Patent: Sep. 13, 2011

(54) METHOD OF VEHICLE SEGMENTATION AND COUNTING FOR NIGHTTIME VIDEO FRAMES

(75) Inventors: Chao-Ho Chen, Tai-Nan (TW); Jun-Liang Chen, Changhua County (TW); Chao-Ming Chang, Tainan (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 568 days.

(21) Appl. No.: 12/248,054

(22) Filed: Oct. 9, 2008

(65) Prior Publication Data

US 2009/0316957 A1    Dec. 24, 2009

(30) Foreign Application Priority Data

Jun. 23, 2008   (TW) ................. 97123332 A

(51) Int. Cl.
  *G06K 9/34*   (2006.01)

(52) U.S. Cl. ............. 382/173; 382/103; 382/206
(58) Field of Classification Search ............ 382/103, 382/104, 107, 162, 167, 173, 260, 286, 291; 348/148, 149
See application file for complete search history.

(56) References Cited

U.S. PATENT DOCUMENTS

| | | | |
|---|---|---|---|
| 6,636,257 B1 * | 10/2003 | Harada et al. | 348/148 |
| 7,483,549 B2 * | 1/2009 | Nagaoka et al. | 382/104 |
| 7,747,039 B2 * | 6/2010 | Fujimoto | 382/103 |

* cited by examiner

*Primary Examiner* — Phuoc Tran
(74) *Attorney, Agent, or Firm* — Winston Hsu; Scott Margo

(57) ABSTRACT

Vehicle segmentation and counting method based on the property of color variation and headlight information combining change detection in nighttime traffic environment (one-way road with coming direction) is provided. The goal is to reduce the effect of ground-illumination that decreases the accuracy of vehicle segmentation. Besides, the amount of traffic flow is calculated and it can be used in other post-applications, such as traffic-flow reporting or controlling.

5 Claims, 13 Drawing Sheets

(A)

(B)

(a)

(b)

METHOD OF VEHICLE SEGMENTATION AND COUNTING FOR NIGHTTIME VIDEO FRAMES

BACKGROUND OF THE INVENTION

1. Field of the Invention

The present invention relates to a method of vehicle segmentation and counting for night video frames, and more particularly, to a method of vehicle segmentation and counting utilizing the property of color variation and headlight information combining change detection in nighttime traffic environment.

2. Description of the Prior Art

Video object segmentation additionally considers the temporal information so it can process moving objects from video sequences. In video segmentation, indoor situation is more extensively discussed than the outdoor condition. However, the video surveillance system is the most common application in multimedia video, and it is unrealistic to deal only with the indoor condition. Outdoor circumstances can also be separated into daytime and nighttime conditions. Nighttime occupies almost half a day so that the video object segmentation in nighttime should be as important as daytime segmentation while most of the reported methods focus on daytime methods.

There are more affecting factors in outdoor circumstance than indoor condition, and even more obvious in nighttime. Normally, the streetlamps will affect the color of ground and produce the shadow of object. Also, they may make the reflection on the surface of static object at some angle and lead to erroneous segmentation of the moving object. Moreover, cars or bikes have bright headlights which are turned on to illuminate forward on the dark ground for driving (or riding) safety. Ground-illumination produced by headlights will be detected as moving object and deeply reduce the accuracy of object segmentation. Hence, outdoor video object segmentation in nighttime is a difficult task and most of the proposed methods can not obtain a satisfied result.

There are different methods to deal with outdoor-and-night condition in the prior art. Some methods handling the night surveillance sequence focus only on cars by processing the headlight pair information, and then exclude other regions in difference frame. Due to the high brightness of headlight, it is easy to get the headlight information. However, if the illumination on the ground appears to be a lamp because of the over-bright headlight, it will be detected as two cars (or bikes) while in fact there is only one. Furthermore, the above problem can't be overcome because it has lost the information of object body. Some methods use the far-infrared images to detect objects by measuring the thermal radiation. It can classify cars and pedestrians, but it may fail when the shape of object is asymmetric. Besides, it only uses the static image information but don't exploit the temporal information so it can not be employed to accomplish vehicle counting in traffic scenes.

Another problem in nighttime outdoor segmentation is the shadow effect. Methods in the prior art deal with shadow condition in daytime and obtain the satisfied result. However, most of the shadow detection methods focus on daytime environment without considering the following issues. First, at night shadows are produced by the streetlamps so that one object may have several shadows in different directions. Second, because the distance between object and streetlamp is much smaller than that between object and sky, the umbra region may be bigger than penumbra so that the previously mentioned methods handling penumbra region will fail. Due to these problems, shadow detection is a difficult task in night outdoor segmentation.

SUMMARY OF THE INVENTION

The present invention provides a method of vehicle segmentation and counting for night video frames, comprising: generating a background frame according the video frames; converting the video frames from RGB data to HSI data; converting the background frame from RGB data to HSI data; inputting the HSI data of the video frames and the HSI data of the background frame to a Gaussian filter so as to generate Gaussian data of the video frames and Gaussian data of the background frame; updating the Gaussian data of the background frame; determining changed regions and unchanged regions of the video frames to generate a frame difference mask and a background subtraction mask according to the Gaussian data of the video frames and the Gaussian data of the background frame; detecting an object region of the video frames to generate a static region mask and a moving region mask according to the frame difference mask and the background subtraction mask; combining the static region mask and the moving region mask to generate an initial object mask; detecting characteristic information of the moving object to calculate the amount of the moving objects; excluding an interference region of the moving object and compensating the object region of the video frames to generate a final object mask; and obtaining the moving object from the video frames according to the final object mask.

These and other objectives of the present invention will no doubt become obvious to those of ordinary skill in the art after reading the following detailed description of the preferred embodiment that is illustrated in the various figures and drawings.

DETAILED DESCRIPTION

Basically, the computational burden of the segmentation method using motion estimation will be over half of the system operations. Besides, in order to get more accurate contours, watershed segmentation of spatial methods is often used to compensate the deficiency of temporal methods. However, the spatial segmentation must process frame successively, and the time-cost of the watershed method is also high. So the method combining spatial and temporal information will greatly lower the efficiency and is not suitable for real-time applications.

Figure 1:
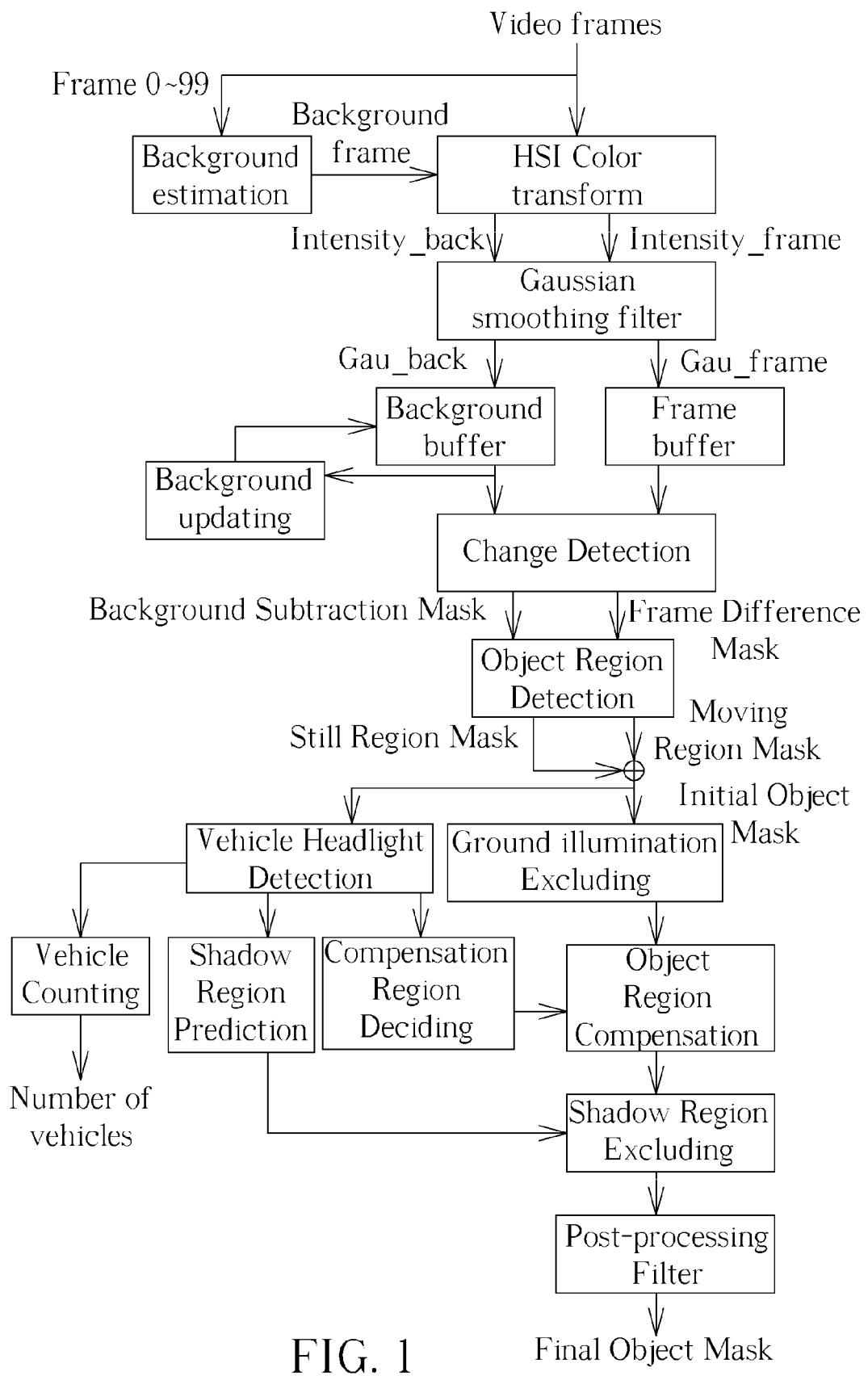
FIG. 1 is a block diagram of the present invention.

For implementing in a real-time system, the present invention modified the change detection based video segmentation method for daytime environments to be suitable for nighttime environments. The modification is described below. The HSI transform is used to get the color information for segmentation. Moreover, the present invention uses the first 100 frames to estimate the initial background instead of the first frame. By change detection the present invention can obtain the initial object mask. Because the method is often used for daytime segmentation so that in nighttime condition there are not only real objects but also shadows and illumination caused by headlights on the ground. To reduce the error region, the present invention proposes a method using the color information and a concept of variation ratio to detect and exclude the ground-illumination and shadows following vehicles. By headlight detection the present invention can obtain the headlight information for object region compensation. Furthermore, utilizing the headlight information the present invention can also calculate the amount of the traffic flow. FIG. 1 shows the diagram of the present invention. The present invention assumes that the background of video source is static and the camera is fixed because it is normal in applications like surveillance and traffic flow counting systems. The concepts in the proposed segmentation method are briefly introduced below, and the details will be described in the next chapter.

1. HSI Color Transformation and Analysis

Human vision can distinguish moving objects from the background by not only the motion information but also the color distribution in the environment. So, the present invention uses color space transformation to transform RGB (Red, Green, Blue) into HSI (Hue, Saturation, Intensity). Generally, I (intensity) is the only information used in the kernel of motion segmentation, however in our method the other two components of H (hue) and S (saturation) are of use to ground illumination and shadow detection.

2. Change Detection

Change detection model is applied to obtain the changed and unchanged regions. The input is the difference frame of inter-frames or background subtraction. Next, histogram analysis and pixel classification are achieved to identify every pixel whether it changes or not. The present invention employs the background estimation to obtain the background frame instead of the first frame of sequence to adapt the condition of moving objects in the first frame.

3. Object Region Detection

The present invention applies object region detection combining the output of change detection to obtain the conditions of object region including moving region, still region, background region and uncovered background region, and then the initial object mask is obtained by combining the moving and still regions.

4. Ground-Illumination Detection and Excluding

In order to exclude the wrong region due to car or bike headlights in initial object mask, the present invention proposes a concept of color variation ratio and uses the color information in background region to detect possible ground-illumination pixels and then remove them from initial object mask.

5. Vehicle Headlight Detection and Object Region Compensation

Because of the high brightness of headlight, it is easy to obtain the useful information utilized to do following object region compensation, shadow region prediction and vehicle counting. The present invention proposes a method classifying the car and bike headlights, and then for each vehicle the present invention uses the headlight(s) to decide a vehicle region. Afterwards, the present invention supposes pixels inside the region should belong to real object body so that pixels detected as ground-illumination within the area will be compensated back to object mask.

6. Shadow Region Detection and Excluding

The present invention use the headlight information to predict possible region of shadow, afterward the present invention employs the concept similar to ground-illumination detection to classify shadow pixels. Finally pixels of shadow are removed from object mask to acquire a more accurate object mask.

7. Vehicle Counting

Another application of headlight information is the vehicle-flow counting. The present invention uses a counting line and a prediction region to implement the counting. Every vehicle passing through the counting line is counted.

8. Post-Processing

Finally, to obtain the object mask with smoother boundary, morphological processing involving closing and opening operations are performed.

In order to implement real time video object segmentation, the present invention employs change detection to obtain the difference of inter-frames or between current and background frames. After that, the statistic method is used to estimate values of standard deviation and mean for the following pixel classification. Background region, uncovered background region, still region and moving region are then detected and finally by combining them the initial object mask is formed.

Human vision can differentiate moving objects from background in dark environment by the difference of color and brightness. Transformation is usually utilized to separate the intensity component from color components. In color transformation, the HSI model is the most appropriate to describe the human vision to color information. The hue (H) component naturally show the property of color, and the saturation (S) component measures the level of adding white light to pure color. Moreover, the intensity (I) component shows the degree of brightness. The present invention uses Eq. (1) to transform RGB components into HSI components.

$$H = \begin{cases} \theta, & \text{if } B \leq G \\ 360 - \theta, & \text{if } B > G \end{cases}, \quad (1)$$

$$\theta = \cos^{-1}\left\{\frac{\frac{1}{2}[(R-G)+(R-B)]}{[(R-G)^2+(R-B)(G-B)]^{1/2}}\right\}, 0° \leq H \leq 360°$$

$$S = 1 - \frac{3}{(R+G+B)}[\min(R, G, B)]$$

$$I = \frac{1}{3}(R+G+B)$$

The present invention uses the intensity information for moving object detection. The hue and saturation components are used for ground-illumination detection and shadow detection. Because the present invention uses the intensity frame and the change detection method to obtain the motion information, if a background model exists, the accuracy of background-foreground separation will be raised. To acquire a good background model, the present invention exploits the first 100 frames of the video sequence and records the values of intensity for each pixel with the same coordinate. The mean value of each point is estimated to form the initial background of intensity, as shown in equation (2).

$$I_i(x, y) = \{I_0(x, y), \ldots , I_{99}(x, y)\} \quad (2)$$

$$I_{mean}(x, y) = \frac{\sum_{i=0}^{99} I_i(x, y)}{100}$$

In image and video processing, the Gaussian function is often used to smooth the video frame that suffers from noises caused by electronic elements of the capturing components. The Gaussian smoothing filter in two dimensions is given by:

$$g(i, j) = c \times e^{-\frac{(i^2+j^2)}{2\sigma^2}} \quad (3)$$

where c is a constant which decides the amplitude of Gaussian filter and σ controls the degree of smoothing image.

The difference frame which is the difference between two successive frames is often utilized in change detection based segmentation methods. A difference frame includes two parts: foreground and background. The values of pixels in the foreground region are higher than those in the background region. The foreground area corresponds to the moving region while the background area corresponds to the non-moving region. Sometimes the difference value in the background is high due to environment effects, e.g., change of illumination or noises. This will make the pixels in the background be mistakenly classified as foreground in the change detection. Moreover, the module of background subtraction is performed by differentiating the current frame and the background frame. The result is very similar to the difference frame. Let $f_{t-1}(x,y)$ and $f_t(x,y)$ be the video frames at t and t−1, respectively, the difference frame is given by:

$$d_t(x,y) = |f_t(x,y) - f_{t-1}(x,y)| \quad (4)$$

Figure 3:
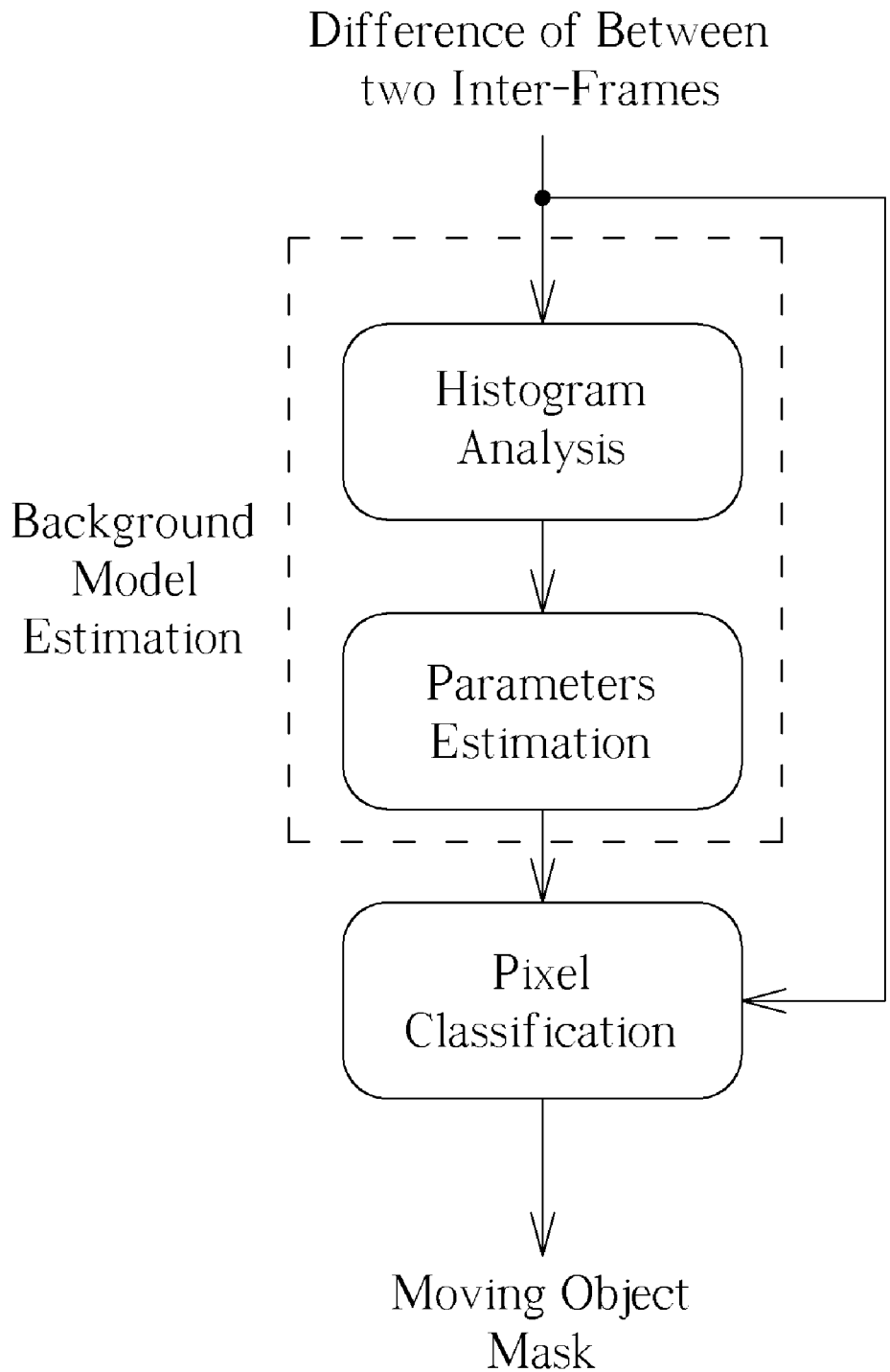
FIG. 3 is a block diagram of histogram-based change detection.

The goal of change detection is to separate the difference frame into the changed and unchanged regions by a threshold obtained from background estimation. The present invention employs the histogram-based change detection constructed from the difference frame. The block diagram of histogram-based change detection is shown in FIG. 3. The basic idea is to analyze the gray-level or color distributions for exploiting the characteristics of the difference frame. Moreover the peak of histogram gives information about the background region.

First, the present invention chooses the gray-level p' which has the maximum number His(p') of pixels, and then uses these two values to estimate the background model. Generally, the random noise occurs between inter-frames, thus the background part of the difference frame can be regarded as Gaussian distribution. The probability density function of Gaussian for the background region can be modeled as:

$$p(d) = \frac{1}{\sqrt{2\pi\sigma_b^2}} e^{-\frac{(d-\mu_b)^2}{2\sigma_b^2}} \quad (5)$$

where d is the pixel value in background region of the difference frame, $\mu_b$ and $\sigma_b$ are the mean and standard deviation of the background region, respectively. At first, the values of mean $\mu_i$ and standard deviation $std_i$ will be calculated for each point of gray-level p' within a window of size N*N. Next, the values of global mean $\mu_b$ and standard deviation $\sigma_b$ are estimated by:

$$\mu_{w_i}(p') = \frac{1}{N*N} \sum_{j=1}^{N*N} w_i(j) \quad (6)$$

$$std_{w_i}(p') = \sqrt{\frac{1}{N*N} \sum_{j=1}^{N*N} [w_i(j) - \mu_{w_i}(p')]^2},$$

for $i = 1, 2, \ldots , His(p')$ $$\mu_b = \frac{1}{his(p')} \sum_{i=1}^{his(p')} \mu_{w_i}(p')$$

$$\sigma_b = \frac{1}{his(p')} \sum_{i=1}^{his(p')} std_{w_i}(p'), \text{ for } i = 1, 2, \ldots , His(p')$$

where $w_i(j)$ is the gray value of j-th pixel in the i-th window.

Finally, the estimated values can be used to classify the pixel in the difference frame into unchanged region (gray "0" denoted) and the changed region (gray "255" denoted), as described by:

if $(|DF(x, y) - \mu_b| \geq k * \sigma_b)$     (7)

⇒ change region else

⇒ unchanged region where DF(x,y) is the pixel value at coordinate (x,y) of the difference frame, k is the constant which depends on video content. In the present invention, this constant is set from 10 to 20 for dark environments.

Figure 2:
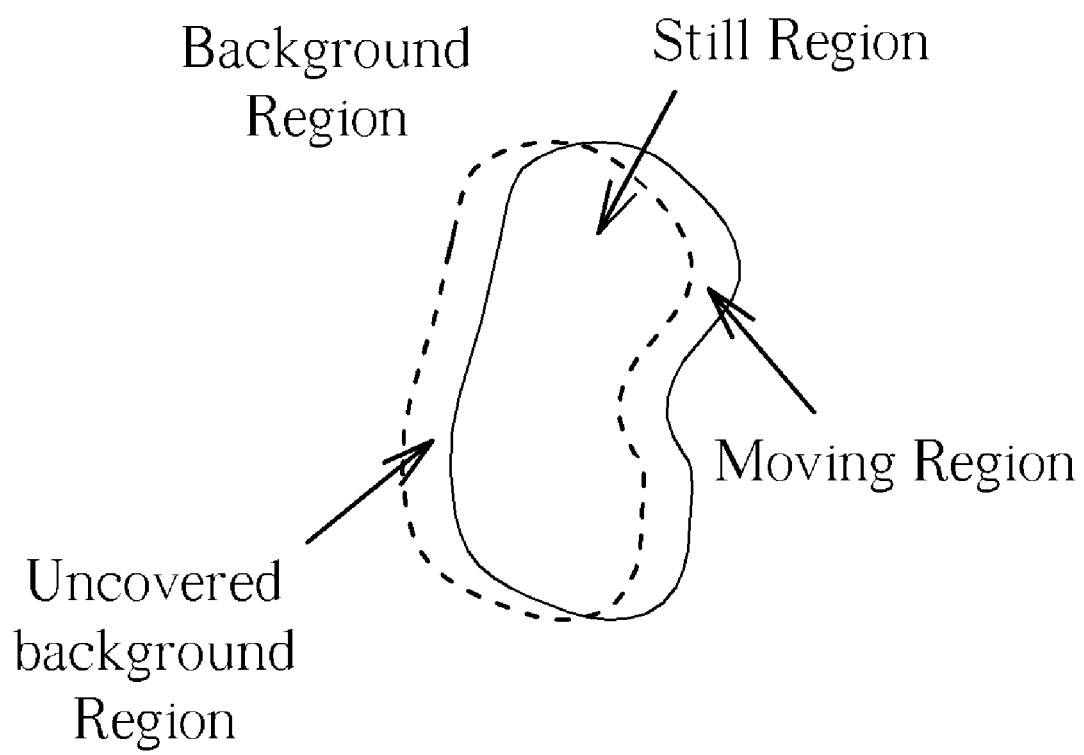
FIG. 2 is a diagram of the object moving region.

The object region detection is used to detect the object region in our method. Table 1 lists the corresponding values of ON/OFF (changed/unchanged) for each pixel in the frame difference mask and the background subtraction mask for four types of regions. The corresponding regions indicated in the table are illustrated in FIG. 2 in which an object moves from the left side to the right side.

TABLE 1

| Object region detection | | |
|---|---|---|
| Region Type | Background Subtraction Mask | Frame Difference Mask |
| Background region | OFF | OFF |
| Uncovered background region | OFF | ON |
| Still region | ON | OFF |
| Moving region | ON | ON |

Figure 4:
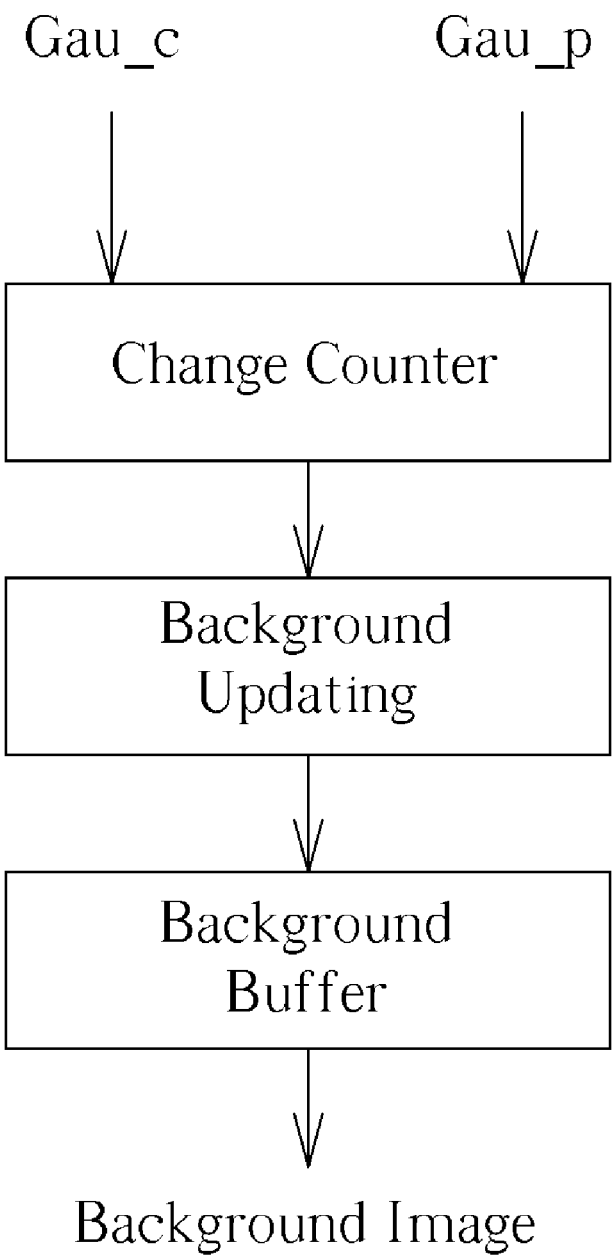
FIG. 4 is a block diagram of the background updating method.

Background updating is used to renew a scene when the moving object shifts out or when the state of moving object switches to still and vice versa. The shape of a moving object is extracted by utilizing the difference between the reference frame and the following frame without background updating. But it will fail when the just mentioned situations occur. For this reason, the present invention employs the background updating in our method. FIG. 4 shows the block diagram of the background updating where Gau_c and Gau_p denote the current and previous frames after Gaussian smoothing, respectively.

First, for each position of a frame, a counter count(x,y) counts the times of successive changes of inter-frames. For the same coordinate (x,y), if the gray level difference between Gau_c and Gau_p is smaller than the threshold $Th_{diff}$, it is classified as unchanged and count(x,y) will be added by one. Oppositely, if the difference value is bigger than $Th_{diff}$, count (x,y) will be reset to zero. When the value of count(x,y) equals to the constant $t_{count}$, the value of the coordinate (x,y) of Gau_c will be updated to the same position of Gau_back with count(x,y) being reset to zero, as shown in Eq. (8), where Gau_c(x, y), Gau_p(x, y) and Gau_back(x, y) are the values of Gau_c, Gau_p and Gau_back at the coordinate (x,y).

$$count(x, y) = \begin{cases} count(x, y) + 1, & \text{if } \left| \frac{Gau\_c(x, y) -}{Gau\_p(x, y)} \right| < Th_{diff} \\ 0, & \text{otherwise} \end{cases} \quad (8)$$

$$Gau\_back(x, y) = \begin{cases} Gau\_c(x, y), & \text{if } count(x, y) \geq t_{count} \\ Gau\_back(x, y), & \text{otherwise} \end{cases}$$

From the histogram-based change detection and object region detection, the present invention obtains the initial object mask $OM_{initial}$ by combining the moving region and still region. Not only the vehicles but also the ground-illumination and shadow are segmented into the initial object mask. This error region of object detection will greatly reduce the accuracy of segmentation and hence should be removed.

Normally in a dark environment, streetlamps are set along the road and headlights of vehicles are turned on by drivers. Generally speaking, the color of streetlamp is either yellow or white and so is the vehicle headlight. Yellow streetlamps make the ground look yellow and white streetlamps bluish (if there are trees near the streetlamps, it may be greenish due to reflection of leaves). Besides, ground-illumination looks yellow because of yellow headlight and bluish (or white if it is too bright) if white.

To detect the ground-illumination, its feature must be exploited first. In order to simplify the condition of traffic scene, we focus on single side lane of coming direction. Obviously, the region is produced by headlights so it is certainly in front of the vehicle, i.e., below the object in the frame. Moreover, the value of intensity in the illuminated area must be bigger than that of background. The present invention can roughly divide the background into yellow and white streetlamp situations by estimating the average values of R, G and B components of the background region in the initial object mask, as shown in Eq. (9).

$$R_{mean} = \frac{\sum_{OM_i(x,y)=0} R_{back}(x, y)}{\sum_{OM_i(x,y)=0} 1} \quad (9)$$

$$G_{mean} = \frac{\sum_{OM_i(x,y)=0} G_{back}(x, y)}{\sum_{OM_i(x,y)=0} 1}$$

$$B_{mean} = \frac{\sum_{OM_i(x,y)=0} B_{back}(x, y)}{\sum_{OM_i(x,y)=0} 1}$$

Backgrounds are separated into two circumstances as yellow streetlamp and white streetlamp situations by Eq. (10).

$$\text{if } (R_{mean} > G_{mean} > B_{mean}) \quad (10)$$
$$\Rightarrow \text{yellow streetlamp situation}$$
$$\text{else if } (B_{mean} > G_{mean} > R_{mean} \text{ or } G_{mean} > B_{mean} > R_{mean})$$
$$\Rightarrow \text{white streetlamp situation}$$

Ground-illumination belongs to foreground area and has two color situations similar to streetlamps. Table 2 displays four cases of ground-illumination in different backgrounds. The effect of headlight is more apparent than streetlamp, therefore the color of illumination appears to be like headlight.

TABLE 2

Ground-illumination color under different streetlamp colors.

| Headlight | Streetlamp | |
| --- | --- | --- |
| | Yellow | White |
| Yellow | Yellow | Yellow |
| White | Blue | Blue |

The present invention defines three ratios $R_{ratio}$, $G_{ratio}$ and $B_{ratio}$ in Eq. (11). These values represent the level of variation in each color channel.

$$R_{ratio} = R_{current}/R_{back}$$

$$G_{ratio} = G_{current}/G_{back}$$

$$B_{ratio} = B_{current}/B_{back}$$

$R_{current}$, $G_{current}$, $B_{current}$: value of current frame $R_{back}$, $G_{back}$, $B_{back}$: value of background frame (11)

When both streetlamp and headlight are yellow, the order of level of R, G and B components does not change. Furthermore, the value of saturation is reduced due to the illumination by headlight, so the variation of the B component is bigger than those of R and G. Equation (12) gives the conditions of ground-illumination.

$$\text{if}(I_{current} > I_{back} \text{ and } R_{current} > G_{current} > B_{current} \text{ and }$$
$$B_{ratio} > R_{ratio} \text{ and } B_{ratio} > G_{ratio}) \Rightarrow \text{Ground-illumination} \quad (12)$$

where $I_{current}$ and $I_{back}$ are the intensity values of the current and background frames.

The value of the B component is smaller than those of R and G in the yellow background but bigger in the ground-illumination region produced by white headlight. Consequently, the variation of B is larger than those of the other two components. The conditions of ground-illumination are given in Eq. (13).

$$if(I_{current} > I_{back} \text{ and } B_{current} > R_{current} \text{ and } \\ B_{current} > G_{current} \text{ and } B_{ratio} > R_{ratio} \text{ and } \\ B_{ratio} > G_{ratio}) \Rightarrow \text{Ground-illumination} \quad (13)$$

For white-streetlamp and white-headlight, the relation $B_{back} \geq G_{back} > R_{back}$ is met and hence there is a blue background. Moreover, if there are trees near the streetlamps, leaves may reflect the light and make the ground look greenish and the relation will become $G_{back} > B_{back} > R_{back}$. Due to the yellow illumination, the value of R component becomes bigger than those of the other two components and hence the variation of R is stronger, and the condition is described in Eq. (14).

$$if(I_{current} > I_{back} \text{ and } R_{current} > G_{current} > B_{current} \text{ and } \\ R_{ratio} > G_{ratio} \text{ and } R_{ratio} > B_{ratio}) \Rightarrow \text{Ground-illumination} \quad (14)$$

Basically, the situation of white-streetlamp and white-headlight is similar to that of yellow-streetlamp and yellow-headlight. The level order of R, G and B components does not change and the value of saturation decreases so that $R_{ratio}$ is larger than $G_{ratio}$ and $B_{ratio}$ and the condition is given in Eq. (15).

$$if(I_{current} > I_{back} \text{ and } B_{current} > R_{current} \text{ and } \\ B_{current} > G_{current} \text{ and } R_{ratio} > G_{ratio} \text{ and } \\ R_{ratio} > B_{ratio}) \Rightarrow \text{Ground-illumination} \quad (15)$$

For the yellow background, the present invention just deals with the situations of yellow-streetlamp/yellow-headlight and yellow-streetlamp/white-headlight. Similarly, the present invention handles only the situations of white-streetlamp/yellow-headlight and white-streetlamp/white-headlight for blue background. After detection, the pixels belong to ground-illumination will be removed from the initial object mask and the object mask $OM_g$ is then obtained.

Although most of ground-illumination pixels are detected, some of real object region is also classified as ground-illumination because of the illumination by streetlamps. In order to recover the object region, the present invention proposes a method to reclassify the object pixels to the object mask. The details are described in following subsections.

In order to recover the object region, the present invention proposes a method of headlight detection and then utilizes the information to do the classification of car and bike. First, the initial object mask is used to obtain the maximum and minimum values of gray level $Max_{gray}$ and $Min_{gray}$ in the object region. Then, the present invention defines a value $G_r$ to limit the range of possible headlight pixels as:

$$G_r = (Max_{gray} - Min_{gray})/c \quad (16)$$

where c is a constant controlling the value of $G_r$.

The intensity value of white headlight approaches 255. However, for yellow headlight the present invention takes an extremely large value to be the R component. In intensity, the present invention gives a tolerable range of two times of Gr. For yellow headlight, the present invention gives the B component with an extremely large value and the intensity has a range of Gr. Eq. (17) gives the condition of possible headlight detection.

$$if(R > (Max_{gray} - G_r) \text{ and } (Max_{gray} - 2*G_r) \leq I \leq \\ Max_{gray}) \Rightarrow \text{Yellow Headlight}$$

$$if(B > (Max_{gray} - G_r) \text{ and } (Max_{gray} - G_r) \leq I \leq \\ Max_{gray}) \Rightarrow \text{White headlight} \quad (17)$$

where I means the intensity value of the object region.

After the detection the present invention can acquire the approximate headlight information. However, the ground-illumination may lead to false detection because the headlight is too bright. Although the present invention can obtain the headlight information, the present invention still has to classify the headlights into cars, bikes and errors.

Each car has a pair of headlights while each bike has only one. Moreover, the width/height ratio of a car is different from that of a bike. In our method, the present invention pays more attention to cars than to bikes because the former is the major part of traffic flow.

Figure 5:
FIG. 5(a) is a diagram illustrating a headlight pair.
FIG. 5(b) is a diagram illustrating a headlight pair and two bike headlights.
Figure 5:
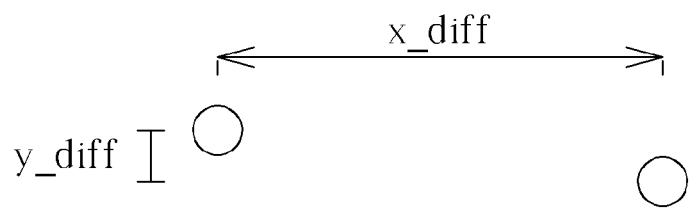
Figure 5:
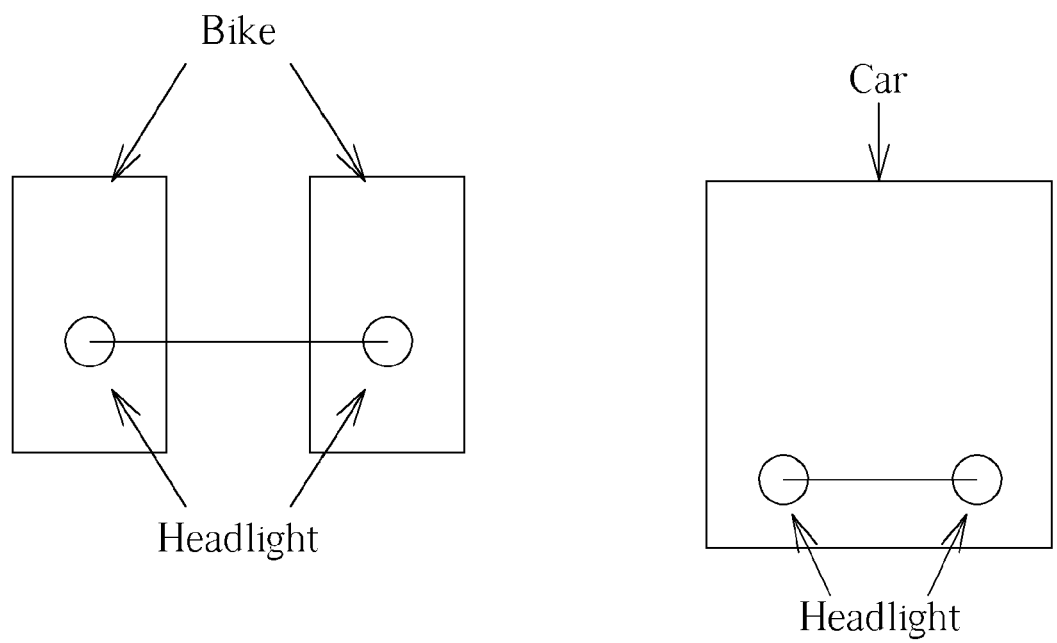

For each mass of possible headlight in the headlight mask, the present invention uses the center pixel to represent it. As shown in FIG. 5, for every two headlight pixels the present invention obtains the distances x_diff and y_diff in both coordinate directions of x and y and then the width/height ratio is obtained by:

$$ratio_{w/h} = \frac{x\_diff}{y\_diff} \quad (18)$$

Because the present invention focuses on the lane of coming direction, the headlight pair of a car must meet the following condition:

$$ratio_{w/h} > c, c \text{ is constant} \quad (19)$$

where c is a positive integer since the pair of headlights appears to be horizontal. In our method, c is set to 5.

Moreover, the numbers of these two headlight masses should be similar and pixels on the line segment between the two points should all belong to object region. Combining these constraints, the present invention can obtain the condition of car headlights:

$$if(ratio_{w/h} > 5 \text{ and } num_{l,r} > th_{l,r} \text{ and } 0.5 < ratio_{num} < \\ 2) \Rightarrow \text{Headlight pair of car} \quad (20)$$

where $num_{l,r}$ denotes the number of pixels, belonging to the initial object mask, on the line segment $\overline{lr}$ of the two headlight points l and r. $th_{l,r}$ is the threshold number and $ratio_{num}$ is the ratio of the pixel numbers of the two headlight masses. In our method $th_{l,r}$ is set to $0.8*\overline{lr}$. The condition $num_{l,r} > th_{l,r}$ is used to avoid mistakenly classifying two bike headlights as a pair of car headlights. FIG. 5(b) shows the different types of headlight pair. The present invention can recognize that on the line segment from the left to the right headlight points the pixels are almost in the object region for a car and in the background for two-bike.

Figure 6:
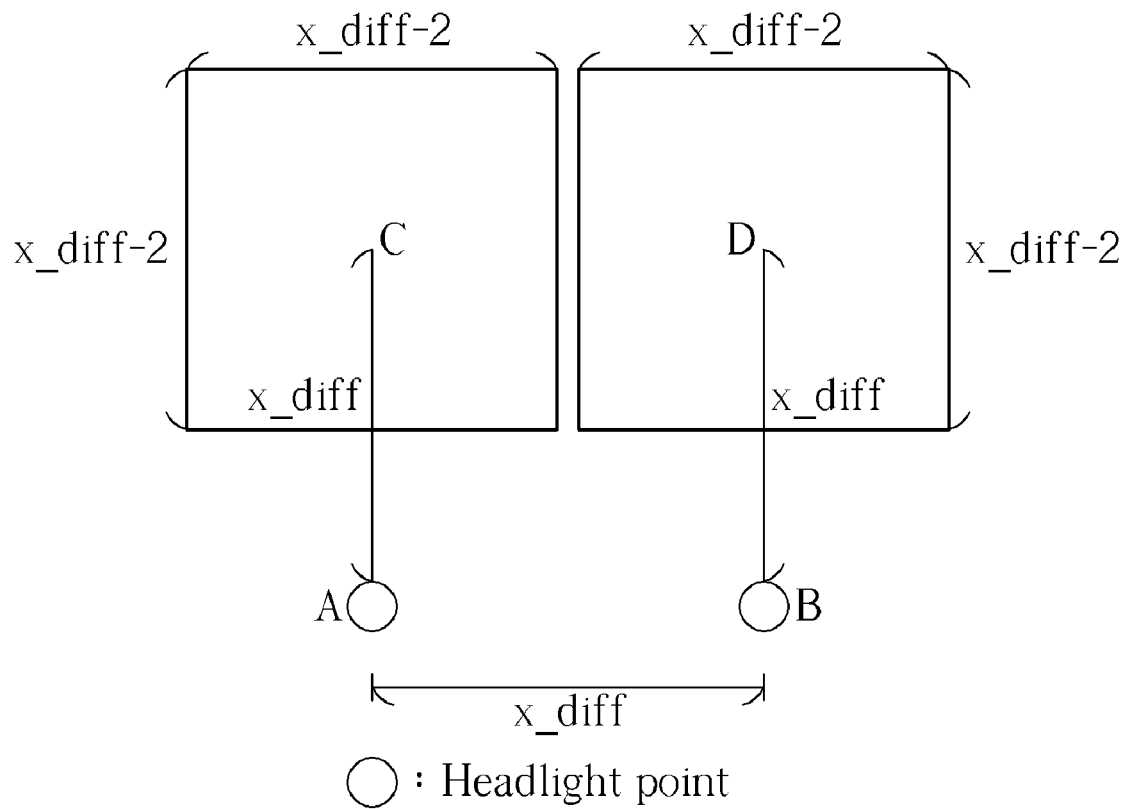
FIG. 6 is a diagram illustrating another searching region of two headlight points.

Another problem of car headlight classification is too-bright illumination. Two masses of ground-illumination are also classified as car headlight pair because the conditions are met. Normally, there are another two headlight masses behind the ground-illuminations and the present invention can utilize this property to determine if the headlight pair is too bright. First, the present invention takes two points behind the headlight points at a distance of x_diff and uses them as the center points to determine two regions as shown in FIG. 6. Next, if there are other points of headlight in both regions, further classification given in Eq. (21) is required. The concept is that for ground-illumination masses the pixels in ground-illumination mask on $\overline{AB}$, $\overline{AC}$ and $\overline{BD}$ should occupy the greater part of each line segment. Finally, too-bright illumination masses are removed from the car headlight mask.

$$\text{if} \begin{pmatrix} num_{\overline{AB}} > \frac{x\_diff}{2} \text{ and } num_{\overline{AC}} > \\ \frac{x\_diff}{2} \text{ and } num_{\overline{BD}} > \frac{x\_diff}{2} \end{pmatrix} \quad (21)$$

$\Rightarrow$ too-bright ground-illumination masses

Figure 7:
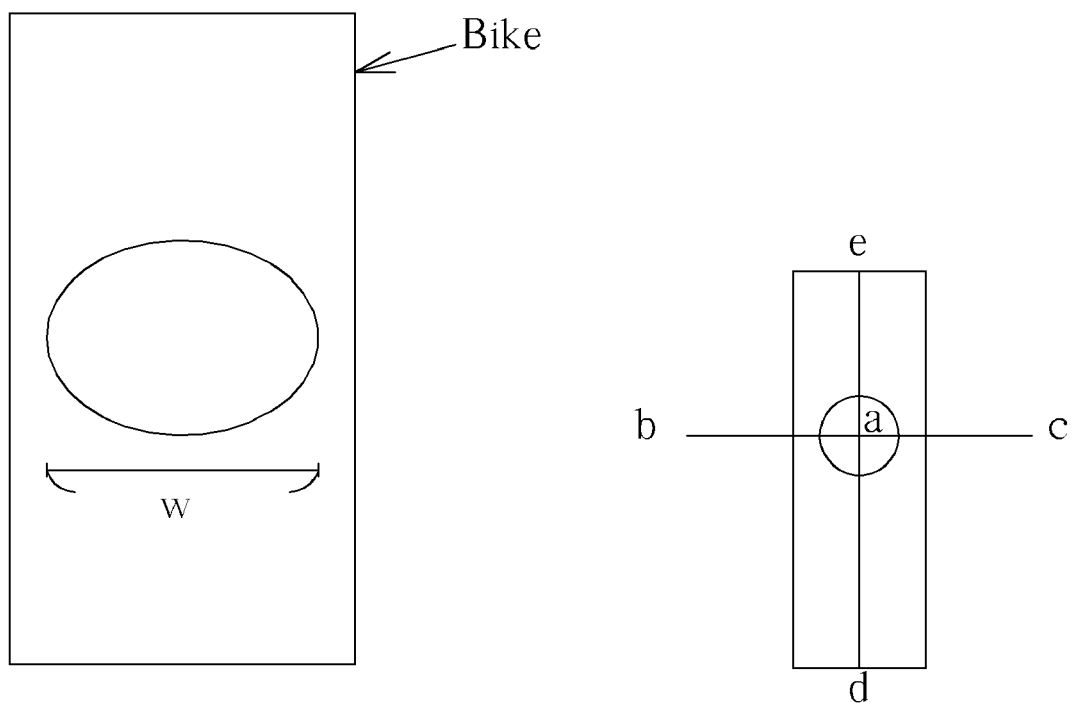
FIG. 7 is a diagram illustrating a bike structure and the four line segments defined by the present invention.
Figure 8:
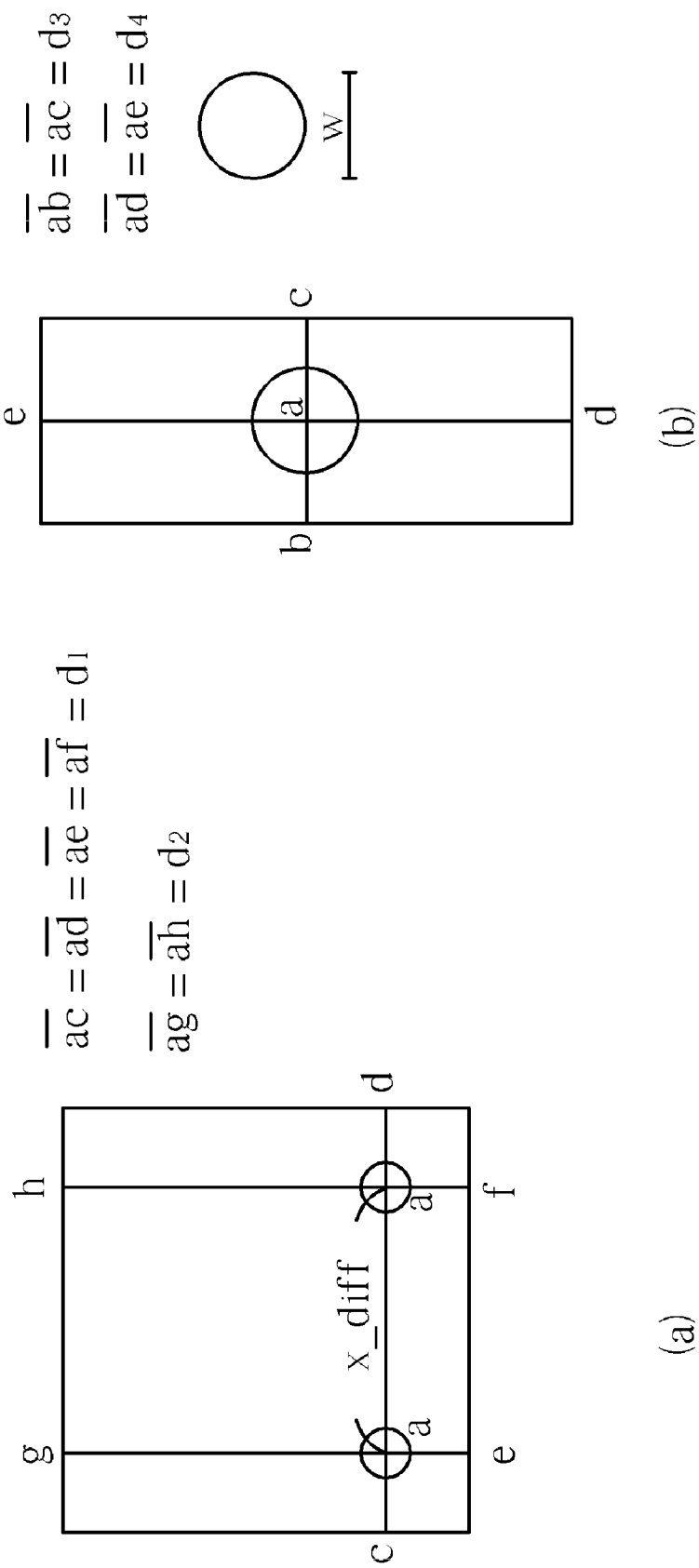
FIG. 8(a) is a diagram illustrating the compensation region of vehicle.
FIG. 8(b) is a diagram illustrating the compensation region of bike.

FIG. 7 shows the structure of a bike. In order to classify the bike, the present invention defines four line segments $\overline{ab}$, $\overline{ac}$, $\overline{ad}$ and $\overline{ae}$. If the conditions in Eq. (22) are met, the shape of object should be thin and the point is classified as a headlight of a bike.

condition 1. pixels belonging to (22)

initial object mask on $\overline{ab}$ are less than $\frac{3w}{2}$ condition 2. pixels belonging to initial object mask on $\overline{ac}$ are less than $\frac{3w}{2}$ condition 3. pixels belonging to initial object mask on $\overline{ad}$ are more than $\frac{5w}{2} - 5$ condition 4. pixels belonging to initial object mask on $\overline{ae}$ are more than $\frac{7w}{2} - 5$ if condition 1 ~ 4 are met $\Rightarrow$ headlight of bike After the classification, the present invention can utilize the headlight information to decide the compensation region for cars and bikes. In the case of cars, the present invention uses the headlight points and the distance x_diff between them to determine an approximate area for compensation. FIG. 8(*a*) shows compensation region of car, and FIG. 8(*b*) shows compensation region of bike. In the case of bike, the present invention just uses the width of headlight to decide the region. In our method, $d_1$ is $$\frac{x\_diff}{3},$$

$d_2$ is $$\frac{6 * x\_diff}{5},$$

$d_3$ is w, and $d_4$ is $$\frac{5w}{2}.$$

These constants can be adjusted to be adaptive for environments with different distances from the camera to the ground.

Finally, pixels belonging to the initial object mask in these regions are added to $OM_g$ and a new object mask $OM_{com}$ will be generated.

Although shadow does not affect the accuracy of segmentation as seriously as ground-illumination, the present invention still removes it for providing high-quality segmentation.

Figure 9:
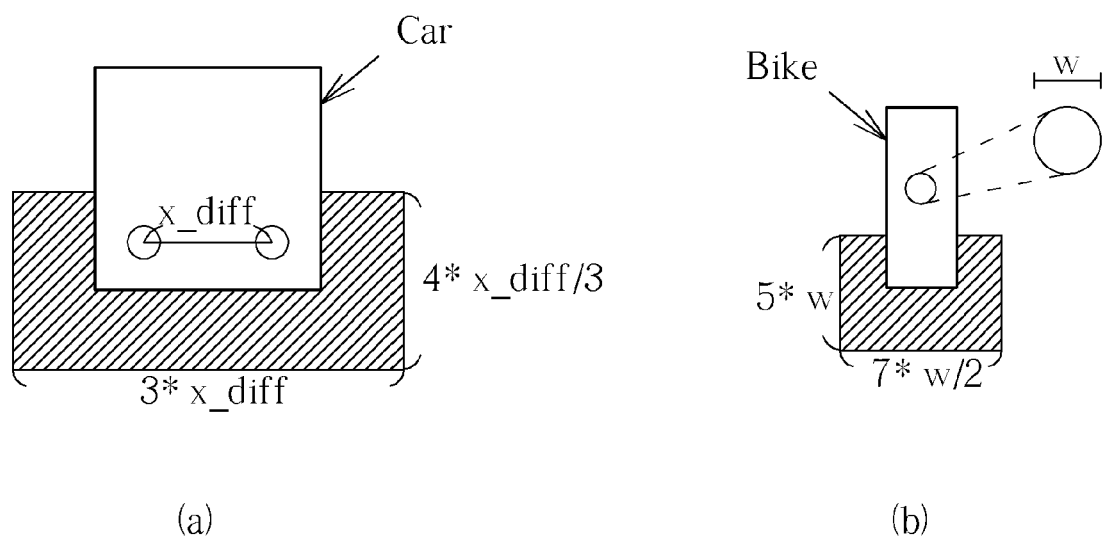
FIG. 9(a) is a diagram illustrating shadow prediction region of vehicle.
FIG. 9(b) is a diagram illustrating shadow prediction region of bike.

The present invention employs the headlight information previously obtained to decide the region for shadow region prediction as shown in FIG. 9.

The present invention utilizes the concept of color variation introduced in the previous section to detect shadow pixels in the prediction region. Shadow reduces the intensity value without changing the color of ground and the level order of R, G and B components. Using these conditions, shadow is detected in the prediction region by Eq. (23).

for yellow background condition:

if($I_{current} < I_{back}$ and $R_{current} > G_{current} > B_{current}$ and
$B_{ratio} > R_{ratio}$ and $B_{ratio} > G_{ratio}$ and
order$_{current}$=order$_{back}$) $\Rightarrow$shadow pixel for blue background condition:

if($I_{current} < I_{back}$ and $B_{current} > G_{current}$ and
$B_{current} > R_{current}$ and $R_{ratio} > G_{ratio}$ and
$R_{ratio} > B_{ratio}$ and order$_{current}$=
order$_{back}$) $\Rightarrow$shadow pixel (23)

After obtaining the shadow mask, pixels belonging to it are removed from the initial object mask and the object mask is obtained.

Figure 10:
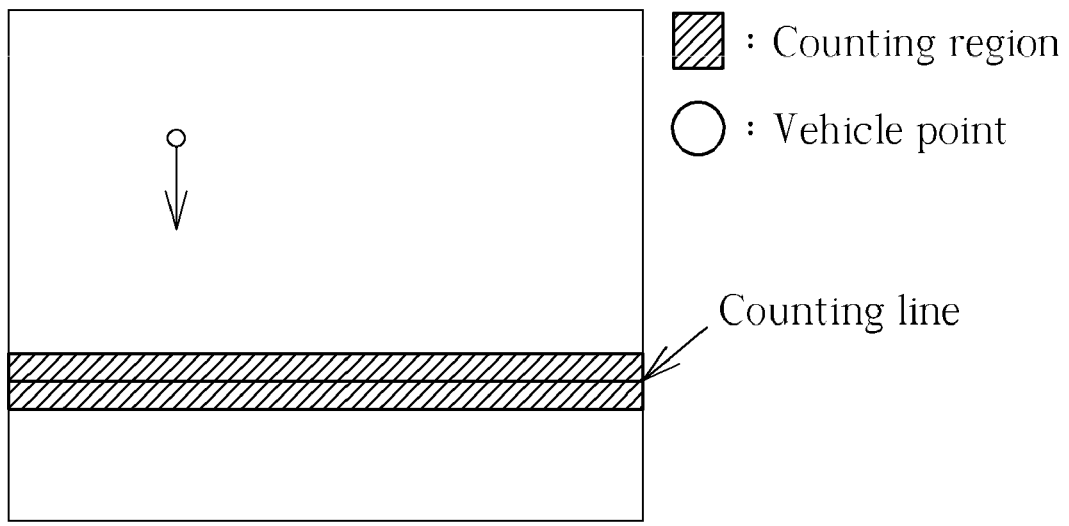
FIG. 10(a) is a diagram illustrating counting region and counting line.
FIG. 10(b) is a diagram illustrating prediction region of headlight of car.
Figure 10:
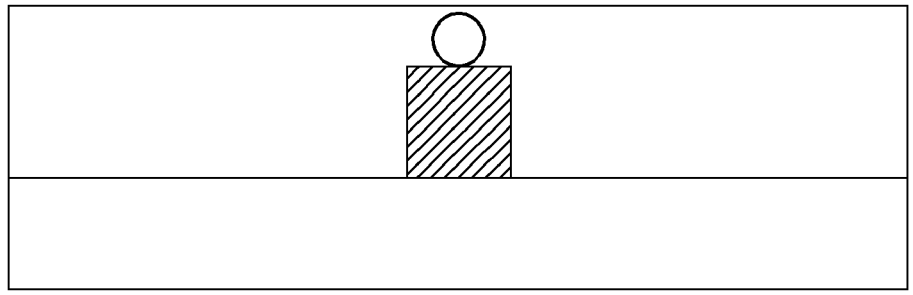

Instead of using vehicle bodies for tracking and counting, the present invention proposed a method employing the vehicle headlight information to calculate the amount of vehicles. A car headlight pair is represented by its midpoint and a bike is represented by its headlight point. First, the present invention defines a region and draws a counting line with y-coordinate y in it as shown in FIG. 10(*a*). Next, when the vehicle point enters the counting region, a 10×10 prediction region below the point is defined as shown in FIG. 10(*b*). If there is a vehicle point $p_{next}$ in the prediction region of the next frame and moreover the y-coordinate of $p_{next}$ is equal to y while the y-coordinate of $p_{current}$ is smaller than y, the counter of vehicle is increased by one.

The closing and opening operations of morphological processing are employed to smooth the boundary of object with a 3*3 structuring element. After such post-processing, the object mask is refined as the final object mask $OM_{final}$ with more complete boundary.

The proposed video object segmentation method was evaluated with three video sequences: Dong-men bridge 03, Dong-men bridge 06, and Chang-rong bridge 02, and their formats are described in Table 3.

TABLE 3

The format of test sequences

| Video Sequence | Resolution | Format | Total Frame |
| --- | --- | --- | --- |
| Dong-men bridge 03 | 320 × 240 | AVI | 691 |
| Dong-men bridge 06 | 320 × 240 | AVI | 692 |
| Chang-rong bridge 02 | 320 × 240 | AVI | 492 |

The software programs are written in C language, compiled and executed on Microsoft Visual C++ 6.0 platform without code optimization.

Initial object segmentation gives the result of change detection without ground-illumination and shadow excluding. Hence, ground-illumination and shadow still remain in the initial object region. In our programs, the present invention takes only the even number frames as inter-frames for speeding the execution. he final object segmentation is obtained by executing ground-illumination and shadow excluding on the initial object segmentation.

In the evaluation of vehicle counting, the present invention uses other three longer sequences, Dong-men bridge 01, Dong-men bridge 04 and Dong-men bridge 08. Table 4 lists the formats of these test sequences. Table 5 describes the results of vehicle counting. An error positive means that the counter is added by one without any real vehicle passing through the counting line and an error negative indicates that the counter missed one vehicle passing through the counting line.

TABLE 4

Test sequences for vehicle counting.

| Video Sequence | Resolution | Format | Total Frame |
|---|---|---|---|
| Dong-men bridge 01 | 320 × 240 | AVI | 1600 |
| Dong-men bridge 04 | 320 × 240 | AVI | 1199 |
| Dong-men bridge 08 | 320 × 240 | AVI | 1002 |

TABLE 5

Results of vehicle counting.

| Video Sequence | Real Vehicle | Counted Vehicle | Error Positive | Error Negative |
|---|---|---|---|---|
| Dong-men bridge 01 | 11 | 9 | 0 | 2 |
| Dong-men bridge 04 | 8 | 8 | 0 | 0 |
| Dong-men bridge 08 | 6 | 5 | 0 | 1 |

For the error negative problem in Table 5, the process of ground-illumination and shadow excluding may fail in some situations as follows:

Situation 1: Because the headlight is located at the front of the vehicle, so when the vehicle starts leaving from the bottom of the frame, the headlight will first disappear and then the compensation region will vanish, too. At this moment, object pixels detected as ground-illumination in error will not be compensated to the object mask and the accuracy of segmentation is reduced;

Situation 2: When two cars parallel to each other move closely, if there is another vehicle moving behind them and illuminating the background region between them, the region will be classified as the object region in the initial object mask. Afterwards, the left headlight of the right car and the right headlight of the left car will be detected as a headlight pair which leads to erroneous compensation of the object region and the ground-illumination will be compensated to the object mask;

Situation 3: Because the ground-illumination is in front of the vehicle, the illumination due to headlight will enter the frame prior to the vehicle. Before the headlights of car are detected the illumination pair of car on the ground may be classified into car headlight pair and the object region compensation is then implemented to compensate the illumination region to the object mask in error.

Besides the above subjective evaluation, objective evaluation of segmentation accuracy is also conducted. The proportion of correct object pixels in the result of segmentation is calculated by:

$$Accuracy_{seg} = \left(1 - \frac{\sum_{(x,y)}[OM_{seg}(x,y) \otimes OM_{ref}(x,y)]}{\sum_{(x,y)}[OM_{seg}(x,y) + OM_{ref}(x,y)]}\right) \times 100\% \quad (24)$$

where $OM_{ref}(x,y)$ is the ideal alpha map, $OM_{seg}(x,y)$ is the object mask obtained from the proposed method, $\otimes$ is the exclusive OR operator and + is the OR operator.

Moreover, the present invention also calculates the error reduction rate of segmentation, as shown in Eq. (25).

$$error_{initial} = \sum_{(x,y)}[OM_{initial}(x,y) \otimes OM_{ref}(x,y)] \quad (25)$$

$$error_{final} = \sum_{(x,y)}[OM_{final}(x,y) \otimes OM_{ref}(x,y)]$$

$$error\ reduction\ rate = \left(\frac{error_{initial} - error_{final}}{error_{initial}}\right) \times 100\%$$

That is, if there are 1000 error pixels in the initial object mask and 400 error pixels in the final object mask, then the error reduction rate is $$\left(\frac{1000 - 400}{1000}\right) \times 100\% = 60\%.$$

Figure 11:
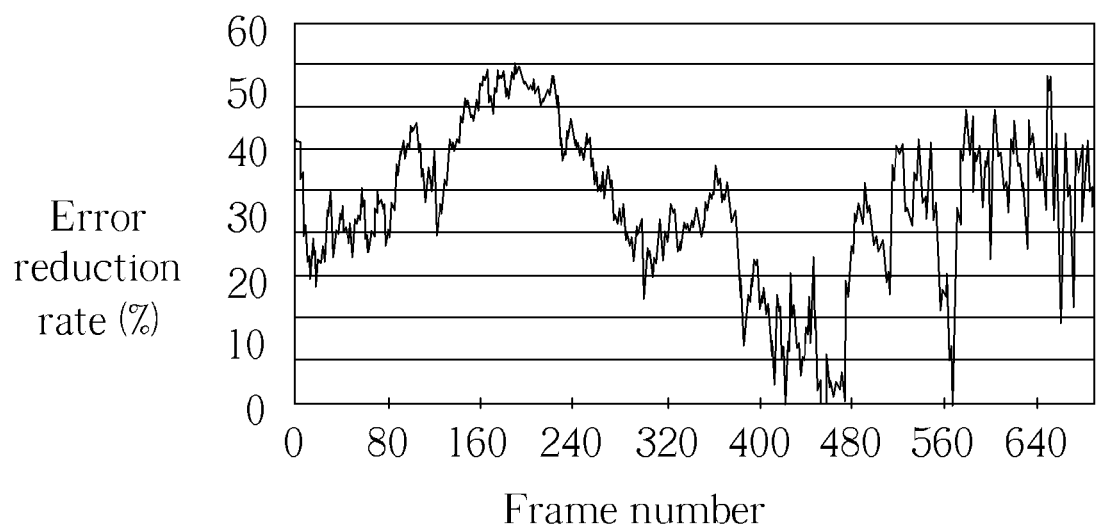
FIGS. 11, 12, and 13 show the error reduction rates for Dong-men bridge 03, Dong-men bridge 06 and Chang-rong bridge 02 sequences, respectively.
Figure 12:
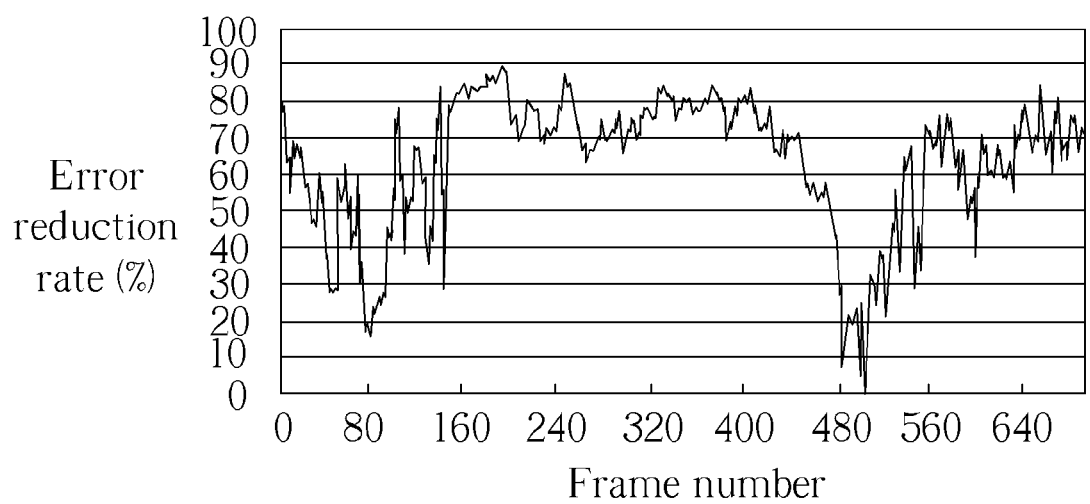
Figure 13:
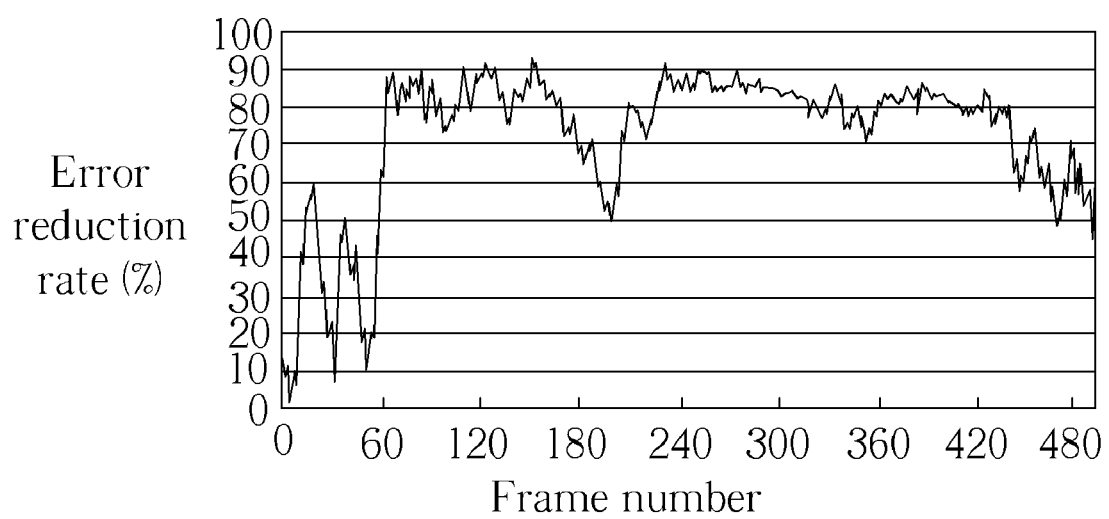

To manifest the improvement on segmentation result in those situations of serious ground-illumination and shadow effect, FIGS. 11, 12, and 13 show the error reduction rates for Dong-men bridge 03, Dong-men bridge 06 and Chang-rong bridge 02 sequences, respectively.

For the Dong-men bridge 03 sequence, the ground-illumination is roughly excluded. The accuracy of segmentation is about 46% and the average error reduction rate is 47.22%. In FIG. 11, the rate is low between frame #400 and #480 because there are vehicles moving in horizontal direction and the object compensation fails and thus there are very many object pixels excluded in the step of ground-illumination excluding.

In the case of the Dong-men bridge 06 sequence, the accuracy of initial object mask is roughly 30% but for the final object mask it is about 56%. In FIG. 12, there is the least effect of ground-illumination at about frame #480 and so the accuracy of the initial object mask is close to the final object mask and the error reduction rate is very low. The average error reduction rate is 63.36%.

Finally, for the Chang-rong bridge 02 sequence, the average accuracy of the final object mask is around 50% and the average error reduction rate is 72.87%.

The average accuracy of the initial and the final object mask for each sequence are listed in Table 6 together with the average error reduction rate.

TABLE 6

Average accuracy and error reduction rate.

| Sequence | Accuracy of $OM_{initial}$ | Accuracy of $OM_{final}$ | Error reduction rate |
|---|---|---|---|
| Dong-men bridge 03 | 33.44% | 46.06% | 47.22% |
| Dong-men bridge 06 | 30.78% | 56.39% | 63.36% |
| Chang-rong bridge 02 | 18.16% | 47.99% | 72.87% |

However, the segmentation result doesn't need to be very accurate for the purpose of counting. The accuracy of vehicle counting is evaluated by utilizing Eq. (26) and the results are shown in Table 7.

$$Accuracy_{count} = \frac{num_{real} - num_{error}}{num_{real}} \times 100\% \quad (26)$$

where $num_{real}$ denotes the number of real vehicles passing through the counting line, and $num_{error}$ is the sum of error positives and error negatives.

TABLE 7

Accuracy of vehicle counting.

| Sequence | $num_{real}$ | $num_{error}$ | $Accuracy_{count}$ (%) |
|---|---|---|---|
| Dong-men bridge 01 | 11 | 2 | 81.8% |
| Dong-men bridge 04 | 8 | 0 | 100% |
| Dong-men bridge 08 | 6 | 1 | 83.3% |
| Average accuracy | | | 88.4% |

Normally, vehicles are correctly counted. In Dong-men bridge 01, one error is due to the mergence of two bikes, another one is due to asymmetric bright headlight pair that will result in misjudgment of headlight pair of a vehicle. In Dong-men bridge 08, the headlight with low brightness leads to failure in headlight detection so that it is not counted.

In the present invention, the present invention proposes an effective video segmentation method for dark or nighttime environments. It bases on change detection and background updating. Because there are no complex operators adopted in our method and simple change detection is utilized to obtain the motion information, the proposed method is very effective. To reduce the effect of ground-illumination, the concept of color variation is used. It detects most of the illumination pixels and decreases the erroneous object pixels. Although some of real object pixels are detected as ground-illumination, the method for object region compensation can roughly decide the real object area and compensate pixels belonging to the vehicle body to the object mask. The headlight information is useful not only for object region compensation but also for shadow region prediction and vehicle counting. Shadow regions are roughly reduced using the similar concept applied to ground-illumination and then the post-processing refines the boundary of object. Finally, by the vehicle counting method, an approximate amount of traffic flow is obtained.

Those skilled in the art will readily observe that numerous modifications and alterations of the device and method may be made while retaining the teachings of the invention.

What is claimed is:

1. A method of vehicle segmentation and counting for night video frames, comprising:

generating a background frame according to the video frames;
converting the video frames from RGB data to HSI data;
converting the background frame from RGB data to HSI data;
inputting the HSI data of the video frames and the HSI data of the background frame to a Gaussian filter so as to generate Gaussian data of the video frames and Gaussian data of the background frame;
updating the Gaussian data of the background frame;
determining changed regions and unchanged region of the video frames to generate a frame difference mask and a background subtraction mask according to the Gaussian data of the video frames and the Gaussian data of the background frame;
detecting an object region of the video frames to generate a static region mask and a moving region mask according to the frame difference mask and the background subtraction mask;
combining the static region mask and the moving region mask to generate an initial object mask;
detecting characteristic information of the moving object to calculate the amount of the moving objects;
excluding an interference region of the moving object and compensating the object region of the video frames to generate a final object mask; and
obtaining the moving object from the video frames according to the final object mask.

2. The method of claim 1, wherein the video frames are nighttime video frames.

3. The method of claim 1, wherein the moving object is a vehicle, and the characteristic information is the headlight information of the vehicle.

4. The method of claim 1, wherein the interference region comprises a shadow region and a ground-illumination region.

5. The method of claim 1, wherein excluding the interference region of the moving object and compensating the object region of the video frames to generate the final object mask is excluding the interference region of the moving object and compensating the object region of the video frames to generate the final object mask according to the characteristic information.

* * * * *